United States Patent [19]

Hartmann

[11] Patent Number: 4,545,123

[45] Date of Patent: Oct. 8, 1985

[54] COMBINATION JIG SAW ADJUSTING MECHANISM

[75] Inventor: James R. Hartmann, Chicago, Ill.

[73] Assignee: SKIL Corporation, Chicago, Ill.

[21] Appl. No.: 598,070

[22] Filed: Apr. 9, 1984

[51] Int. Cl.$^4$ .............................................. B27B 11/02
[52] U.S. Cl. .............................................. 30/393; 74/50
[58] Field of Search ................... 30/272 A, 392–394; 74/50; 83/747, 782; 144/1 E, 1 F, 35 R, 35 A

[56] References Cited

U.S. PATENT DOCUMENTS 3,461,732  8/1969  Gregory .......................... 30/393 X
3,542,097  11/1970  Dudek ................................ 30/392
4,137,632  2/1979  Planzer .............................. 30/393

Primary Examiner—Douglas D. Watts
Attorney, Agent, or Firm—McDougall, Hersh & Scott

[57] ABSTRACT

A reciprocating jigsaw tool having a plurality of selectible fixed linear plunger and blade motions as well as fully adjustable orbital and manual or auto scrolling saw blade control. A single mode selector is provided to select between the above operational modes. The mode selector includes a cam to selectively limit the oscillatory motion of a pivotally mounted plunger upper swivel bearing carriage assembly thereby directly limiting the degree of orbital plunger motion. The mode selector further includes a gear segment in operative engagement with a rack member which, in turn, engages an integral scrolling interface member of the top-mounted scrolling adjustment knob. The scrolling interface member incorporates an annular ring having a gap therein adapted to inhibit upward travel of the rack which, in turn, inhibits orbital saw operation when the plunger and blade is positioned other than in the cut forwardly position. The scrolling interface further includes locking ridges adapted to engage the rack and to preclude rotation of the scrolling adjustment knob when either the orbital or fixed linear mode is selected.

8 Claims, 10 Drawing Figures

COMBINATION JIG SAW ADJUSTING MECHANISM

The present invention relates to a reciprocating saw, such as a jigsaw, and more particularly to a jigsaw incorporating in a single tool the heretofore incompatible features of reciprocal orbital and scrolling blade motion. Further, the present jigsaw provides for complete mode selection from a common function control and, importantly, includes automatic lockout protection against incompatible dual mode operation.

The advantages of providing elliptical or other orbital blade movement transverse to and synchronized with the generally vertical motion of the plunger and blade assembly has long been recognized. Various arrangements have been proposed to implement such motion including the structure disclosed in the co-pending application, Ser. No. 464,634, filed on Feb. 7, 1983, and assigned to the present assignee. In addition, over twenty further examples of mechanisms adapted to impart orbital blade motion were considered in the above co-pending application.

In each of these known structures, means are provided to rigidly attach the saw blade to the plunger for reciprocal movement therewith. The plunger and blade assembly is retained in fixed parallel orientation with respect to the longitudinal axis of the respective saw thereby assuring proper cutting as the tool is advanced forwardly along its axis. In addition, by maintaining the blade in a predetermined fixed cutting plane, orbital motion may be imparted in each of the above structures without undue structural complexity merely by rocking the reciprocating plunger in oscillatory fashion within the vertical plane defined along the longitudinal saw axis.

However, it has been found advantageous to allow rotation of the plunger and saw blade about the plunger vertical axis thereby permitting cutting in directions other than forwardly along the longitudinal saw axis. It will be appreciated that such capability is particularly useful in cramped work quarters where it may not always be possible to position the relatively larger body portion of the saw in trailing orientation along the cutting line. The plunger and blade may be locked in a fixed angular orientation relative to the normal saw cutting axis or it may be unlocked thereby permitting continuous angular adjustment of the blade during cutting operations. This latter unlocked mode of operation is generally known as scrolling. Two forms of scrolling are commonly available. The first is manual scrolling in which the the user manually orients the cutting blade by physically rotating the top-mounted scrolling angular adjustment knob during the cutting operation. The second form is called auto-scrolling and is characterized by a free-wheeling plunger and blade assembly which freely rotates according to the forces acting upon the blade. More specifically, the blade is offset rearwardly of the plunger axis resulting in the blade and plunger assembly rotating into the 'cut' in caster-like fashion. In this manner, proper cutting orientation of the blade is automatically obtained without regard to the precise position of the saw body.

Although the fixed, orbital, and scrolling features each provide, as discussed, highly advantageous and flexible saw operation, there has never been a jig saw combining all these features in a single tool. This is due to the inherent operational incompatibilities of these operational modes and the concomitant intricate and expensive structural complexities necessary to otherwise properly integrate these disparate modes in a single unit. Thus, heretofore it has been necessary to acquire separate saws to obtain both the orbital and off-axis operational features.

The present invention specifically pertains to a reciprocating jig saw structure in which the orbital and the off-axis fixed and scrolling features are properly integrated into a single sax tool and, in particular, where incompatible multi-mode operation is precluded. Thus, the present arrangement provides adjustable orbital motion along the longitudinal axis of the saw as well as fixed angular and full scrolling capabilities. Orbital operation, however, is inhibited during off-axis operation for the reason that the longitudinal rocking orbital motion of the blade produces highly undesirable lateral blade forces whenever the blade is oriented other than along the longitudinal saw axis.

It is therefore an object of the present invention to provide in a single jig saw tool the features of fixed off-axis, adjustable orbital, and scrolling blade motion. Manual as well as automatic scrolling operation shall be available. A plurality of fixed off-axis positions shall be provided, preferably in the cardinal directions. Further, orbital operation of the saw shall be inhibited whenever the fixed off-axis or the scrolling mode of saw operation is selected.

DESCRIPTION OF THE PREFERRED EMBODIMENT

Figure 1:
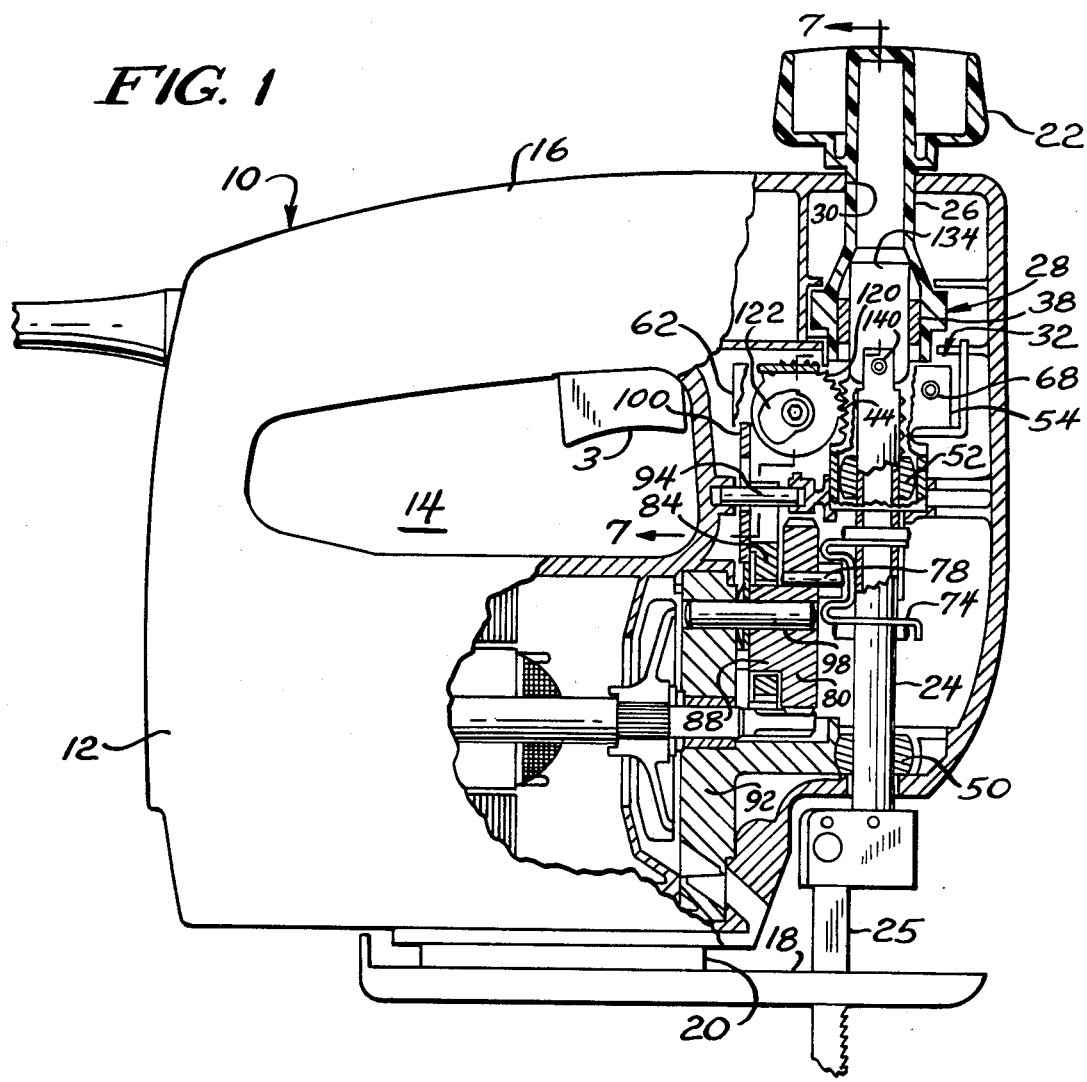
FIG. 1 is a side elevation view, partially in section, showing a jigsaw embodying the present invention.

Referring to FIG. 1, the electrically motor driven jigsaw 10 of this invention includes a housing 12 having an opening 14 therein defining a handle 16. The housing comprises various members including a pair of complementary sides which are mated following assembly of the components described below Foot 18 is supported by, and positioned below, housing 12 by bracket 20.

Figure 2:
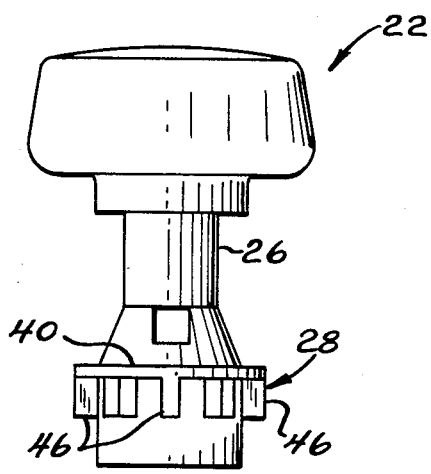
FIG. 2 is a side elevation view of the off-axis direction knob including the integral off-axis interface member thereof.
Figure 3:
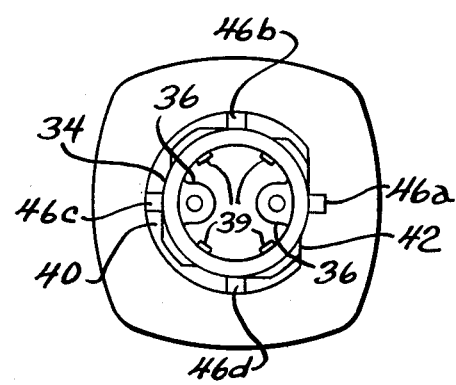
FIG. 3 is a bottom plan view of the off-axis direction knob illustrating the structural features of the integral interface member.
Figure 10:
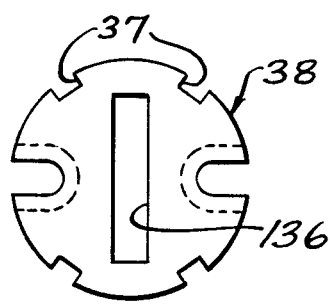
FIG. 10 is a bottom plan view of the angular control member.

A knob 22 is positioned on the housing forwardly of handle 16 and generally above bladeholder shaft or plunger 24. As best illustrated in FIGS. 2 and 3, the knob includes an integral neck portion 26 interconnecting an integral off-axis interface member 28. The knob is retained for rotational movement within a pair of spaced circular openings 30 and 32 of housing 12. Knob 22 serves both as a handle on the front of the saw and as an "off-axis" actuator facilitating angular re-adjustment of plunger 24 and blade 25 with respect to the normal forward cutting longitudinal axis. Off-axis interface member 28 is comprised of a cylindrical body portion 34 having a pair of opposed mounting tabs 36 therein adapted to receive and retain a metallic plunger angular control member 38. Four rectangular recesses 37 in control member 38 (FIG. 10), mate with corresponding ridges 39 (FIG. 3) within body portion 34 thereby aligning control member 38 in predetermined angular orientation with respect to knob 22. An annular ring 40 is formed, with an opening or gap 42 therein, on the outside of body 34. This ring functions to inhibit the upward movement of rack 44 when the saw blade and off-axis adjustment knob 22 are oriented other than in the longitudinal, straight-ahead cut position. As discussed more fully below, however, upward movement of the rack 44 throught the ring gap 42 is permitted for orbital saw operation. In this manner, orbital blade movement is precluded whenever the blade is positioned for off-axis operation.

The ring gap 42 is located adjacent one of the mounting tabs 36 such that the gap is positioned over, or adjacent to, the rack 44 when the non-scrolling, straight-ahead cut operation is selected. When the knob is thusly oriented, rack 44 is free to move upwardly past the ring gap to access the various orbital detent positions. Importantly, when the upper portion of rack 44 is raised above the level of ring 40, corresponding to orbital saw operation, rotational scrolling or fixed off-axis movement of knob 22 is inhibited by an interference between interlock ridge 46a and the rack 44. Thus, ring 40 functions in a dual capacity to preclude orbital saw operation whenever an off-axis position of the saw blade is selected and, similarly, to inibit off-axis operation whenever the saw is in the orbital mode.

The off-axis interface member 28 of knob 22 also includes four integral fixed linear interlock ridges 46a-d spaced uniformly around body 34 and extending downwardly from ring 40. These ridges are adapted to engage slot 48 formed in rack 44 thereby locking the plunger 24 and saw blade 25 against rotational movement in one-of-four selected cardinal orientations during fixed linear operation. In addition, this engagement further assures the proper positioning of the blade and plunger assembly during orbital saw operation.

Figure 4:
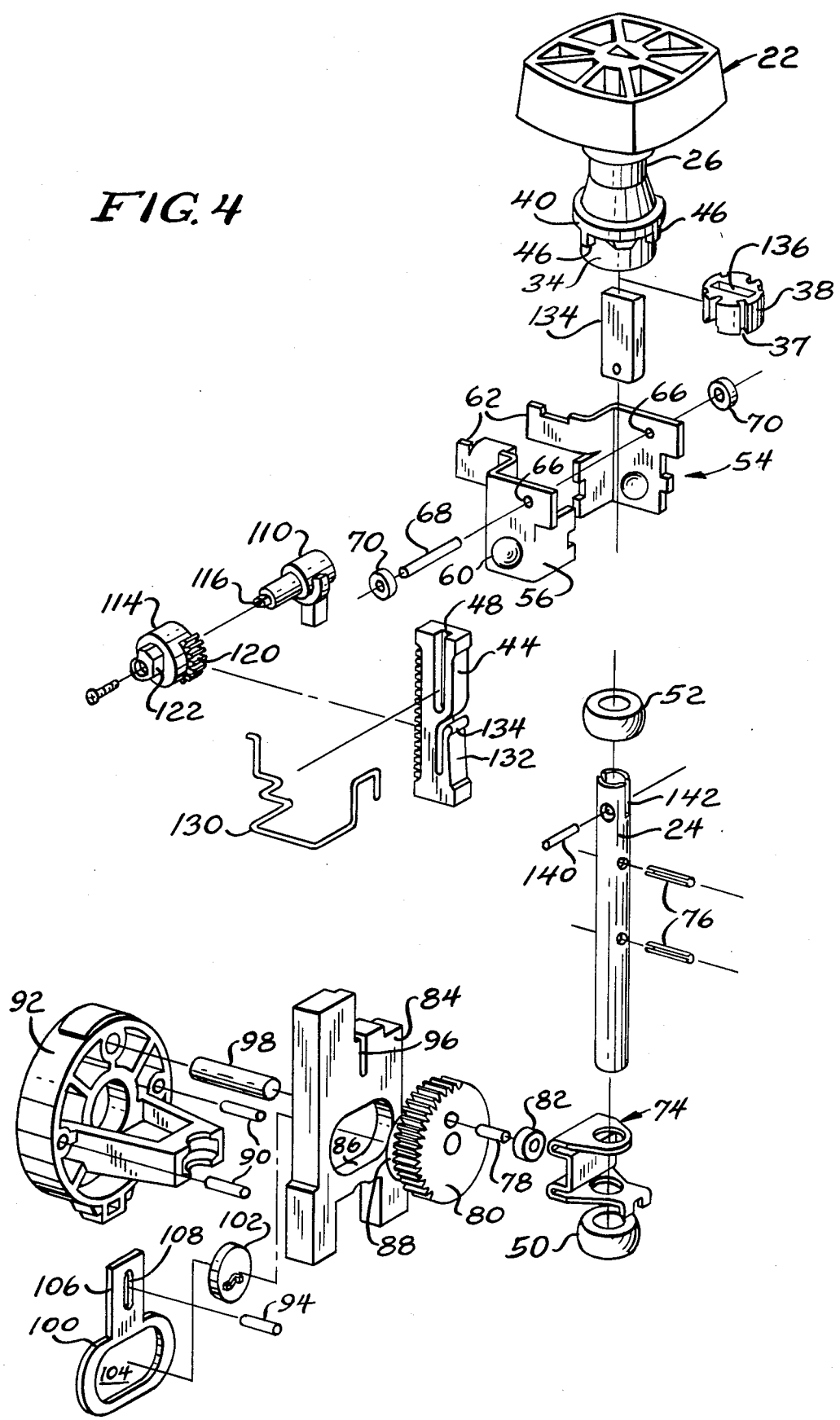
FIG. 4 is an exploded view illustrating the structural interrelationships of the components defining the plunger drive train, orbital control, and off-axis control of the present invention.

Referring to FIG. 1 and the exploded assembly view of FIG. 4, plunger 24 is retained for substantially vertical reciprocal motion within lower swivel bearing 50 and upper swivel bearing 52. Lower bearing 50 is retained within an opening in the housing provided precluding lateral movement thereof. The bearing may freely swivel or rotate within the housing thereby permitting limited axial realignment of plunger 24 as necessary to effect orbital blade motion.

Figure 5:
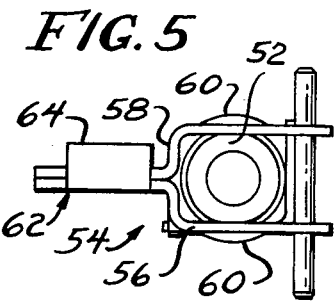
FIG. 5 is a top plan view of the carriage assembly showing the upper swivel bearing therein.
Figure 6:
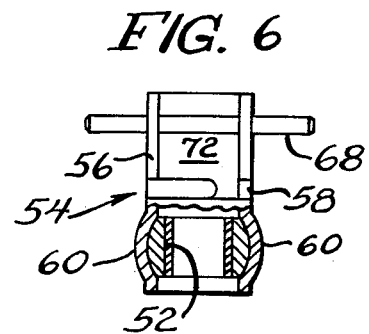
FIG. 6 is a right side elevation view, partially in section, of the carriage assembly and bearing of FIG. 5.

As shown in FIGS. 4, 5, and 6 the upper swivel bearing 52 is contained within a bearing carriage assembly 54 comprising a complementary pair of welded carrier members 56 and 58 having dimples 60 to receive and retain the bearing therein. In addition, the mated carriage members define a pivot arm 62, a pivot limit tab 64, and, further, are provided with holes 66 which receive an axle 68. Axle 68 functions to retain the carriage assembly, including swivel bearing 52, for pivotal rotation and is secured to the housing by axle bearings 70. An opening 72 is provided substantially in the center of carriage assembly 54 to permit the unrestricted passage and reciprocal motion of the plunger assembly therethrough. In this manner carriage assembly 54, with swivel bearing 52 therein, is free to pivot in oscillatory fashion about axle 68. Such pivotal motion of bearing 52 translates into forward and aft movements of the bearing transverse to the axis of plunger 24 which, in turn, forces the upper end of this shaft into corresponding transverse motion as required to impart orbital motion to the saw blade 25 attached to the lower end of the plunger 24.

Axial or reciprocal cutting motion of the saw blade and plunger within bearings 50 and 52 is provided by a Scotch-yoke assembly 74 which functions in the conventional manner to translate the rotational motion of a drive gear into the requisite reciprocal linear blade movement. Scotch-yoke 74 is secured to plunger 24 generally at the mid-region thereof by a pair of locking pins 76. A drive pin 78, rigidly affixed to drive gear 80, eccentric to the rotational axis thereof and having a roller 82 thereon, operatively interconnects the drive gear and Scotch-yoke.

A counterweight 84 is provided to reduce the vibration otherwise introduced by the reciprocating mass comprising the blade, plunger and Scotch-yoke assemblies. As best illustrated in FIGS. 1 and 4, counterweight 84 contains an elongated opening 86 adapted to receive eccentric 88 integrally formed with drive gear 80. The counterweight is positioned for vertical reciprocal motion between a pair of guide pins 90 extending from the front motor bearing plate 92 which is, in turn, rigidly secured to the housing. In addition, a third pin 94, secured directly to the housing, is received within counterweight slot 96 to further guide the counterweight for vertical only movement. Eccentric 88 and drive pin 78 are disposed in opposed relationship with respect to the axis of rotation of drive gear 80 on shaft 98 thereby forcing the counterweight to reciprocate in opposition to the plunger assembly. Thus, the counterweight travels upwardly while the plunger assembly travels downwardly and visa-versa.

The upper bearing carrier assembly 54 is pivotally reciprocated in synchronism with the plunger assembly generally by means of a pusher 100 with contacts carriage assembly pusher arm 62. Specifically, an eccentric or cam 102 is positioned on shaft 98 and is keyed to engage drive gear 80 in a predetermined fixed relationship. Cam 102 is operatively received within an elongated opening 104 of pusher 100, similar to opening 86 of the counterweight, thereby forcing the reciprocal vertical motion of the pusher in synchronism to the rotating drive gear 80. Movement of pusher 100 in the vertical direction, only, is assured by a channel formed in the counterweight adapted to receive the arm portion 106 of the pusher and, further, by pin 94 which extends through a vertically disposed slot 108 in pusher 100. In this manner, pusher 100 is reciprocated in synchronism with gear 80, counterweight 84 and, most significantly, with plunger 24. Plunger 24 reaches its maximum upper limit of travel approximately 30 degrees behind the corresponding upper limit of pusher 100 during any orbital cycle.

During full orbital saw operation, the tip of pusher 100 contacts the bearing carriage assembly arm 62 thereby urging the assembly upwardly into clockwise pivotal rotation, as viewed in FIG. 1, about axel 68.

This clockwise pivotal motion of the carriage assembly causes upper bearing 52 and the upper portion of the plunger to move substantially transverse to the plunger axis in a rearward direction. Since the lower swivel bearing 50 precludes transverse plunger movement, the rearward travel of the upper bearing translates into forward transverse motion of the lower portion of the plunger assembly and, in particular, the saw blade 25, itself.

The force of the workpiece acting rearwardly against saw blade 25 is translated through the lower swivel bearing 50 into a force acting forwardly upon the upper swivel bearing 52. This force urges the counterclockwise rotation of the carriage assembly and acts to bias the assembly and arm 62 against pusher 100. Consequently, as pusher 100 retraces its path to the lowest point of travel, thereby completing one full orbital cutting stroke, arm 62 generally maintains engagement with the pusher. This results in the saw blade returning to its original, most rearward, position.

Figure 7:
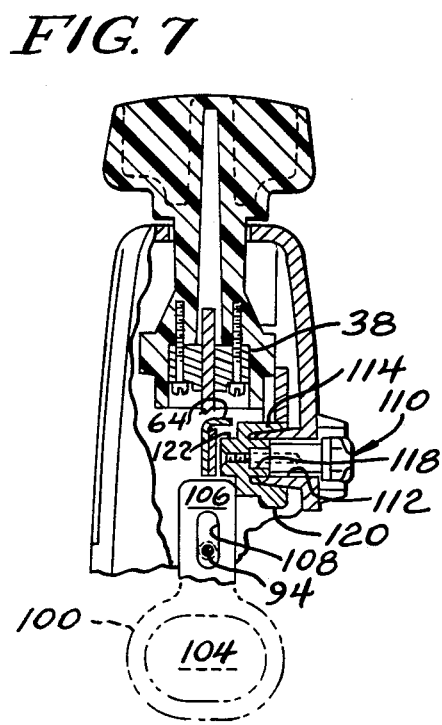
FIG. 7 is section taken along line 7—7 of FIG. 1 showing the single orbital and off-axis mode selector of the present invention.
Figure 8:
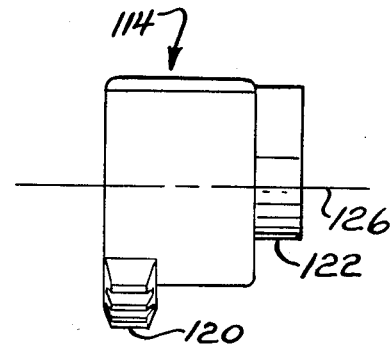
FIG. 8 is side elevation view of the orbital and off-axis selector interface member of the present invention.

The above description defines normal saw operation wherein full orbital blade movement is achieved. In this configuration, the saw blade is characterized by continuous motion both in the vertical and in the transverse directions. Limited orbital or straight non-orbital saw operation may be selected by mode selector knob 110 which, additionally, functions to establish the fixed and scrolling saw operating modes. As best depicted in FIG. 7, mode selector 110 extends inwardly, through a cylindrical opening 112 in housing 12, into locking engagement with interface member 114. A flatted shaft member 116 of selector 110 is received within an interface member recess 118 of similar cross-section thereby aligning the knob and interface member in predetermined orientation and assuring proper unitary rotational motion of the interface member/knob assembly.

As previously indicated, the present invention provides for fixed, full scrolling, and orbital modes control through a single mode selector 110 which, as discussed above, is rigidly interconnected with interface member 114. It will be appreciated that proper integration of the several operating modes, partially to avoid the simultaneous engagement of incompatible operational configurations, requires a coordinated control over the oscillatory movement of upper bearing carriage assembly 54 (orbital modes) and the rotational movement of knob 22 (off-axis modes). To effect the coordinated operation in a saw having a single mode control, interface member 114 is provided with a gear segment 120 adapted to engage and position rack 44 and, further, a cam 122 adapted to restrict the downward pivotal rotation of carriage assembly 54. Thus, movement of selector 110 simultaneously reorients both the off-axis gear segment 120 and the orbital cam 122.

As shown in FIGS. 1 and 7, cam 122 extends inwardly and below carriage assembly tab 64. In the full orbital mode, the cam is oriented with the narrow portion 124 of the cam, that is, that portion of the operative cam surface spaced most closely to the rotational cam axis 126, facing upwardly. In this position, shown in FIG. 1, the carriage assembly is free to oscillate, as previously discussed, over its full range of travel. The carriage tab remains clear of the cam, even at the lowermost point of carriage travel.

Figure 9:
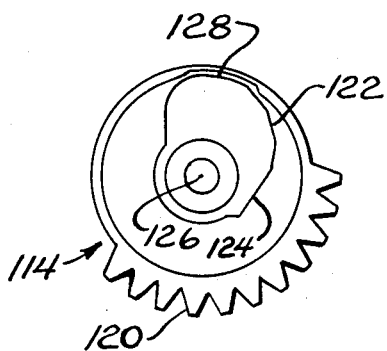
FIG. 9 is a front elevation view of the interface member of FIG. 8 illustrating the orbital cam and off-axis gear segment profiles.

Rotation of selector 110 to a non-orbital mode correspondingly repositions the cam 122 such that the widest portion 128 of the cam, as shown in FIG. 9, is facing upwardly. In this position, cam 122 forces tab 64 and carriage assembly 54 upwardly precluding pusher 100 engagement therewith and holds the carriage assembly in a fixed elevated orientation throughout the entire reciprocal saw cutting stroke. This, in turn, results in the plunger and blade describing a simple reciprocal linear path. Intermediate selector 110 positions result in correspondingly intermediate orbital operational modes between full and non-orbital. In these intermediate variable orbit positions, the carriage assembly oscillates in pivotal fashion during the upper portion of each cutting stroke as the pusher 100 urges carriage arm 62 and tab 64 upwardly above cam 122 but, conversely, orbital motion is inhibited during the lower portion of each cutting stroke in which the tab 64 is in contact with cam 122.

The off-axis gear segment 120 of interface member 114 engages rack 44 which is retained by clip 130 for vertical movement within a channel formed in housing 12. The rack includes a semi-flexible arm member 132 having a transverse rib 134 on the end thereof adapted to engage detents in the housing representative of various degrees of orbital motion. A vertical slot 48 is formed along the inside of the rack to receive off-axis control ridges 46 on knob 22. Rotation of selector 110 from the full orbital position at one extreme, to the scrolling position at the other extreme, corresponds to the downward travel of rack 44 from its highest to lowest position in the housing. Thus, when operated in an orbital mode, rack 44 is extended upwardly into engagement with the off-axis interface member 28 of knob 22. More specifically, the upper portion of rack 44 extends above ring 40, through the gap 42 therein, simultaneously engaging ridge 46a thereby locking knob 22 against rotational movement. The rack, therefore, serves to inhibit off-axis rotational movement of the plunger and blade during all orbital saw operation. Further, the rack also functions in combination with the lower interface portion of knob 22 to block selection of an orbital operating mode where the blade is not positioned directly forwardly along the longitudinal saw axis. In such a situation, upward travel of the rack is blocked by annual ring 40 on knob 22 which, in turn, inhibits the rotational movement of mating interface member 114 and selector 110. Thus, orbital cam 122 is effectively locked in its non-orbital position with the wide portion 128 of the cam facing upwardly.

Rotation of selector 110 from an orbital to a non-orbital mode causes, in addition to the previously considered movement of orbital cam 122, the rack to travel linearly downwardly until the uppermost portion of the rack is below ring 40. There are two non-orbital operating modes defined by distinct rack positions below ring 40. The first or 'fixed' mode occurs where the upper portion of the rack is below ring 40 but above the lower extent of locking ridges 46. In this mode, the plunger and blade may be locked in one-of-four cardinal positions, including the conventional forward cut position, by engagement of the respective ridge 46 within rack slot 48. The second or scrolling mode occurs by the further rotation of selector 110 until both the ring and locking ridges are entirely exposed above the lowered rack. In this position, plunger 24 and blade 25 are free to rotate either by direct user movement of knob 22 or by the castering of the blade and plunger due to the offset mounting of the blade rearward of the central plunger 24 axis. To operate in a fixed linear cutting mode, the rack is fully lowered by selecting the scrolling position; the plunger and blade are rotated to the desired cardinal direction by knob 22; and the rack is raised to the fixed linear position thereby forming locking engagement with a ridge member 46.

The off-axis interface portion 28 of knob 22 is coupled to plunger 24 by plunger guide plate 134 which is received within slot 136 of angular control member 38. As previously indicated, angular control member 38 is held in fixed angular relationship by ridges 37 of knob 22. Guide plate 134 is retained by pin 140 for pivotal movement within a slot 142 formed in the upper end of plunger 24. This arrangement permits the plunger assembly, including guide plate 134, to reciprocate freely along the substantially vertical plunger axis and, further, it allows the top portion of the plunger adjacent the upper swivel bearing and carriage assembly to oscillate fore and aft during orbital saw operation while facilitating direct transmission of rotational forces, as required for manual scrolling operation or adjustment, from the knob to the plunger.

What is claimed:

1. In a power operated reciprocating saw adapted for orbital and scrolling operation, the saw comprising a housing, elongated plunger means defining a substantially vertical axis, bladeholder means on the lower end of the plunger means for mounting a saw blade in parallel relationship to the axis of the plunger and extending downwardly therefrom, lower swivel bearing means in the housing for holding the plunger for reciprocal movement generally along the vertical axis, upper swivel bearing means for holding the plunger for reciprocal movement therein, upper bearing carriage means, having the upper swivel bearing means mounted therein, affixed to the housing for pivotal movement about an axis generally transverse to the vertical axis and to an axis defined along the normal forward longitudinal cutting direction of the saw, the pivotal axis being offset from the vertical plunger axis, drive means for reciprocating the plunger means generally along the vertical plunger axis, means synchronized to the drive means for imparting oscillatory motion to the upper bearing carriage means about the pivotal axis thereby to impart orbital plunger motion, knob means rotably mounted on the housing above the plunger substantially on the vertical axis thereof, means operatively interconnecting the plunger means and knob means adapted to lock said means in fixed rotational relationship about the vertical axis and to impart rotational scrolling motion from the knob means to the plunger means, means for limiting the orbital motion of the plunger means, means for limiting the scrolling motion of the plunger means, mode selector means operatively connected to the means for limiting orbital plunger motion and to the means for limiting scrolling plunger motion wherein orbital or scrolling saw operation may be selected by repositioning said single mode selector means.

2. In a power operated reciprocating saw adapted for orbital and scrolling operation, the saw comprising a housing, elongated plunger means defining a substantially vertical axis, bladeholder means on the lower end of the plunger means for mounting a saw blade in parallel relationship to the axis of the plunger and extending downwardly therefrom, lower swivel bearing means in the housing for holding the plunger for reciprocal movement generally along the vertical axis, upper swivel bearing means for holding the plunger for reciprocal movement therein, upper bearing carriage means, having the upper swivel bearing means mounted therein, affixed to the housing for pivotal movement about an axis generally transverse to the vertical axis and to an axis defined along the normal forward longitudinal cutting direction of the saw, the pivotal axis being offset from the vertical plunger axis, drive means for reciprocating the plunger means generally along the vertical plunger axis, means synchronized to the drive means for imparting oscillatory motion to the upper bearing carriage means about the pivotal axis thereby to impart orbital plunger motion, knob means rotably mounted on the housing above the plunger substantially on the vertical axis thereof, means operatively interconnecting the plunger means and knob means adapted to lock said means in fixed rotational relationship about the vertical axis and to impart rotational scrolling motion from the knob means to the plunger means, means for limiting the orbital motion of the plunger means, means for limiting the scrolling motion of the plunger means, mode selector means operatively connected to the means for limiting orbital plunger motion and to the means for limiting scrolling plunger motion; the means for limiting orbital plunger motion and the means for limiting scrolling plunger motion are operatively interconnected with the mode selector means thereby to inhibit the simultaneous operation of the saw in the orbital and scrolling modes, wherein orbital or scrolling saw operation may be selected by repositioning said single mode selector means.

3. The power operated reciprocating saw of claim 1 wherein the means for limiting the orbital plunger motion includes a cam operatively connected to the mode selector means for unitary movement therewith, the cam being positioned adjacent the carriage means whereby the selector means and cam may be progressively repositioned between a first position in which the carriage means freely oscillates without contacting the cam and a second position in which the cam continuously engages the carriage means thereby precluding all oscillatory motion thereof.

4. In a power operated reciprocating saw adapted for orbital and scrolling operation, the saw comprising a housing, elongated plunger means defining a substantially vertical axis, bladeholder means on the lower end of the plunger means for mounting a saw blade in parallel relationship to the axis of the plunger and extending downwardly therefrom, lower swivel bearing means in the housing for holding the plunger for reciprocal movement generally along the vertical axis, upper swivel bearing means for holding the plunger for reciprocal movement therein, upper bearing carriage means, having the upper swivel bearing means mounted therein, affixed to the housing for pivotal movement about an axis generally transverse to the vertical axis and to an axis defined along the normal forward longitudinal cutting direction of the saw, the pivotal axis being offset from the vertical plunger axis, drive means for reciprocating the plunger means generally along the vertical plunger axis, means synchronized to the drive means for imparting oscillatory motion to the upper bearing carriage means about the pivotal axis thereby to impart orbital plunger motion, knob means rotably mounted on the housing above the plunger substantially on the vertical axis thereof, means operatively interconnecting the plunger means and knob means adapted to lock said means in fixed rotational relationship about the vertical axis and to impart rotational scrolling motion from the knob means to the plunger means, means for limiting the orbital motion of the plunger means, means for limiting the scrolling motion of the plunger means, mode selector means operatively connected to the means for limiting orbital plunger motion and to the means for limiting scrolling plunger motion; the means for limiting the scrolling plunger motion includes a gear means operatively connected to the mode selector means for unitary movement therewith, rack means retained for movement along a path within the housing, the rack means engaging the gear means for corresponding movement therewith, means adapted for locking engagement between the rack means and the knob means whereby rotational movement of the knob means is inhibited for preselected positions of the rack means, wherein orbital or scrolling saw operation may be selected by repositioning said single mode selector means.

5. The power operated reciprocating saw of claim 4 wherein said preselected positions of the rack means correspond, at least, to orbital operation of the saw as set by the mode selector means.

6. The power operated reciprocating saw of claim 4 wherein said preselected positions of the rack means correspond, at least, to fixed off-axis operation of the saw as set by the mode selector means.

7. The power operated reciprocating saw of claim 4 wherein the locking means includes a recess in the rack means and at least one ridge on the knob means adapted to be received within the rack means recess thereby locking the knob means and plunger means in a predetermined angular relationship to the normal forward cutting direction of the saw.

8. The power operated reciprocating saw of claim 7 wherein the knob means includes means adapted to limit movement of the rack means when the knob and plunger means are oriented other than for normal forward cutting operation of the saw, said limited rack movement correspondingly limiting movement of the mode selector means whereby selection of oribital operating modes is inhibited.

* * * * *